UNITED STATES PATENT OFFICE.

GEORGE R. EVANS AND WILLIAM P. PRESCOTT, OF CARSON CITY, NEVADA.

IMPROVEMENT IN FIRE-BRICK COMPOUNDS.

Specification forming part of Letters Patent No. 198,284, dated December 18, 1877; application filed May 16, 1877.

*To all whom it may concern:*

Be it known that we, GEORGE R. EVANS and WILLIAM P. PRESCOTT, of Carson city, county of Ormsby and State of Nevada, have invented an Improved Fire-Brick; and we do hereby declare the following to be a full, clear, and exact description thereof.

Our invention relates to an improved combination of materials for forming fire-bricks which will withstand any ordinary temperature to which they may be subjected.

To make our fire-brick we take the following ingredients: asbestus, common salt, ashes, and fire-clay. The asbestus we first reduce to a fibrous condition. We then mix the fire-clay, ashes, and common salt with water until they are of the consistency of common mortar. We then add the asbestus-fiber and mold into bricks of the desired size.

The office of the mortar is to unite and bind the asbestus-fiber together. The quantity or proportion of each of the ingredients, therefore, is about as follows: two hundred pounds clay, twenty pounds salt, and one hundred pounds wood ashes to every ton of asbestus-fiber.

Each of the above-named ingredients is practically fire-proof, so that a brick manufactured from them will also be fire-proof.

We are aware that fire-bricks composed of asbestus combined with any of the earths, clays, mineral substances, sand or ground stone, are old, and such we do not claim as our invention, as we do not use sand or ground stone, but introduce into our composition ashes and common salt.

Having thus described our invention, what we claim, and desire to secure by Letters Patent, is—

As a new article of manufacture, fire-bricks composed of asbestus-fiber, ashes, common salt, and fire-clay, substantially as above specified.

In witness whereof we have hereunto set our hands and seals.

GEORGE R. EVANS. [L. S.]
WILLIAM PENN PRESCOTT. [L. S.]

Witnesses:
 C. S. MOTT,
 G. L. M. COMSTOCK.